(No Model.)   J. THOMSON.   8 Sheets—Sheet 1.
DIAPHRAGM WATER METER.
No. 358,508.   Patented Mar. 1, 1887.
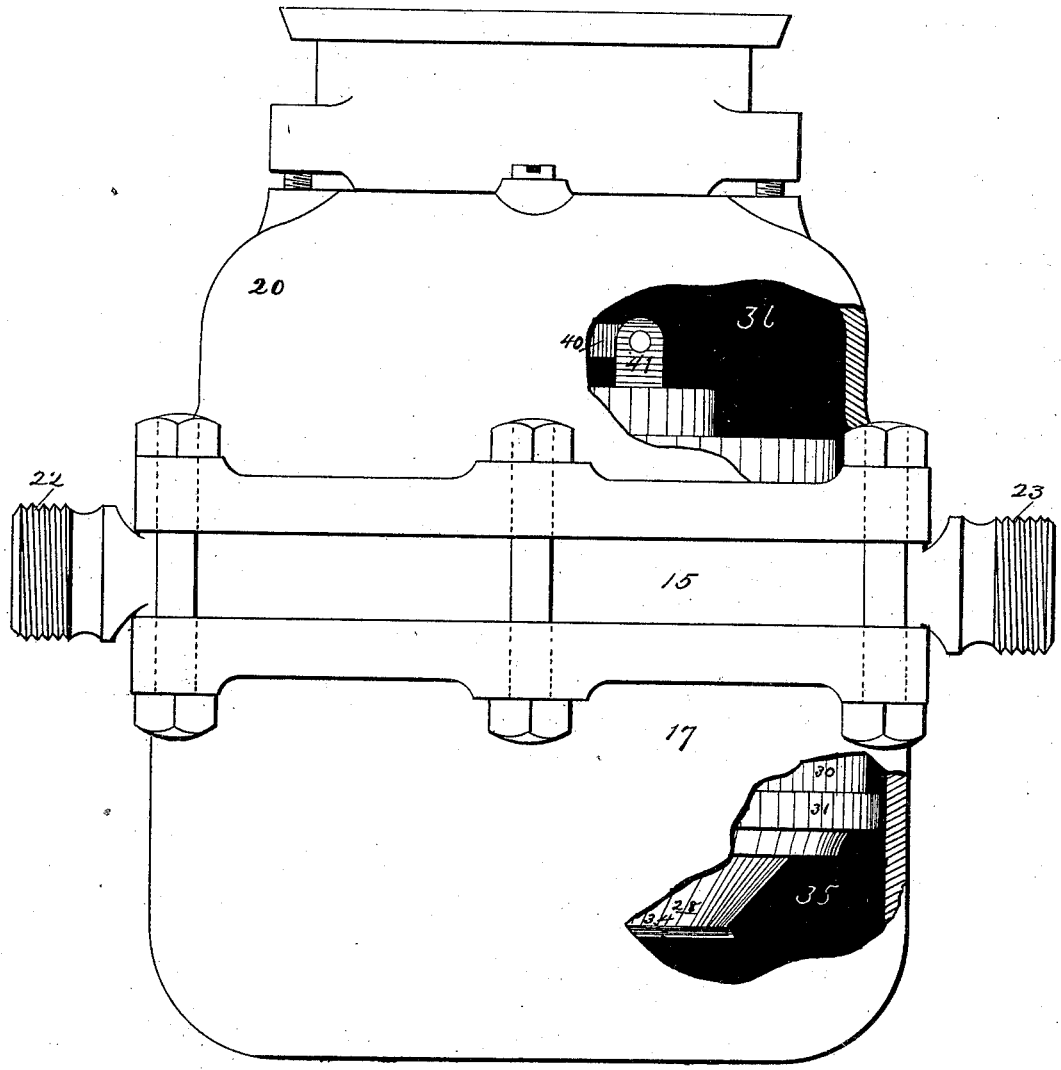

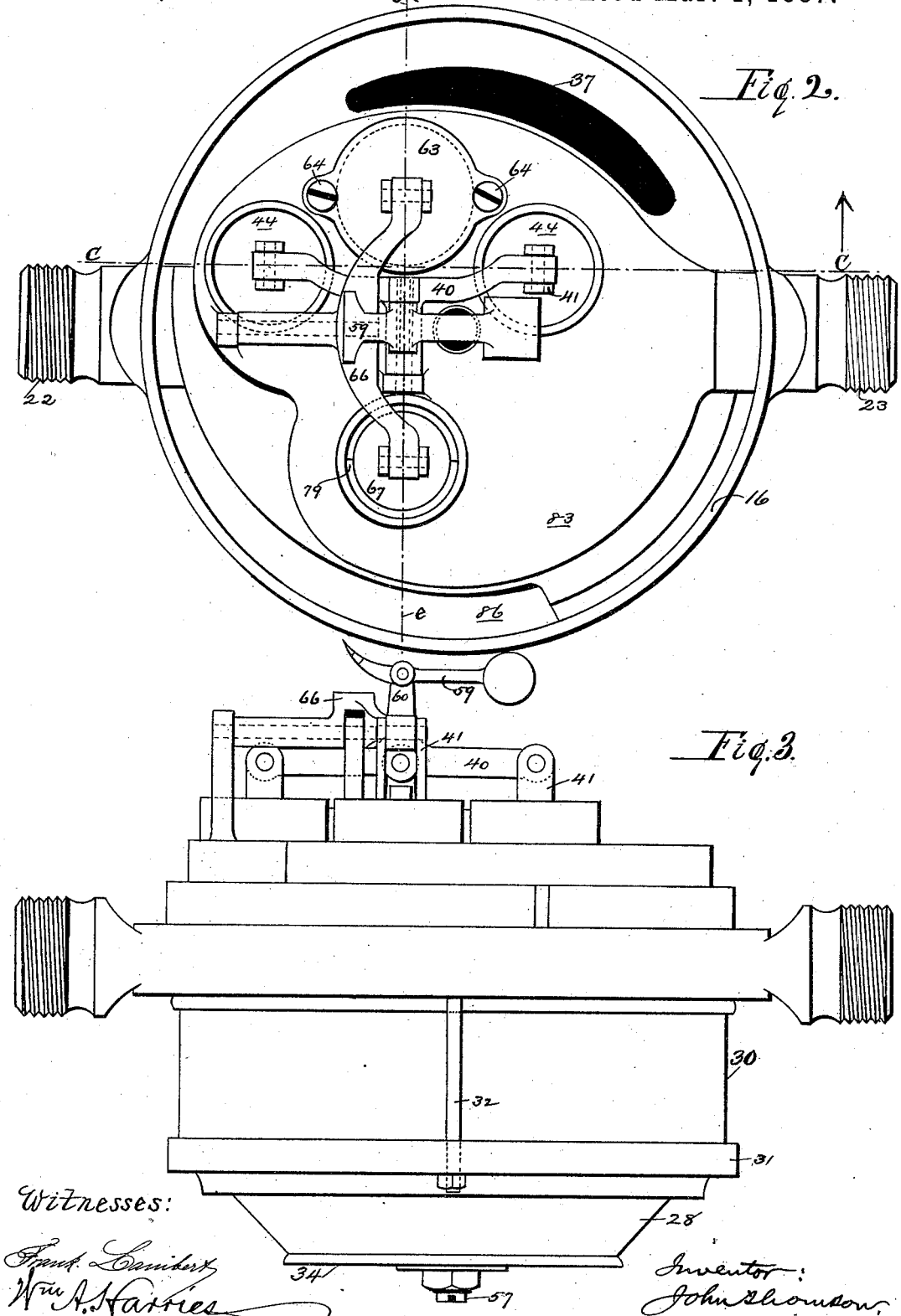

(No Model.) 8 Sheets—Sheet 3.
J. THOMSON.
DIAPHRAGM WATER METER.

No. 358,508. Patented Mar. 1, 1887.

Witnesses:
Frank Lambert
Wm A. Harries

Inventor:
John Thomson

N. PETERS, Photo-Lithographer, Washington, D. C.

(No Model.) 8 Sheets—Sheet 4.

J. THOMSON.
DIAPHRAGM WATER METER.

No. 358,508. Patented Mar. 1, 1887.

Witnesses:
Frank Lambert
Wm A. Harries

Inventor:
John Thomson (No Model.) 8 Sheets—Sheet 5.
J. THOMSON.
DIAPHRAGM WATER METER.
No. 358,508. Patented Mar. 1, 1887.
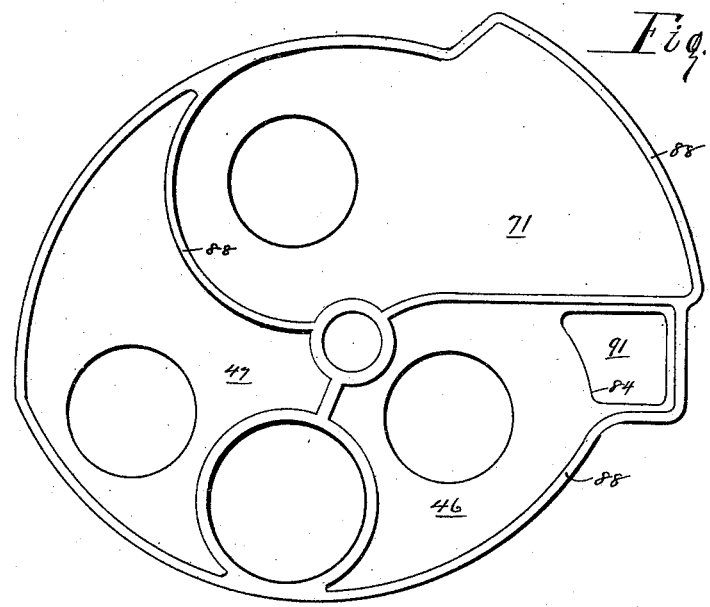
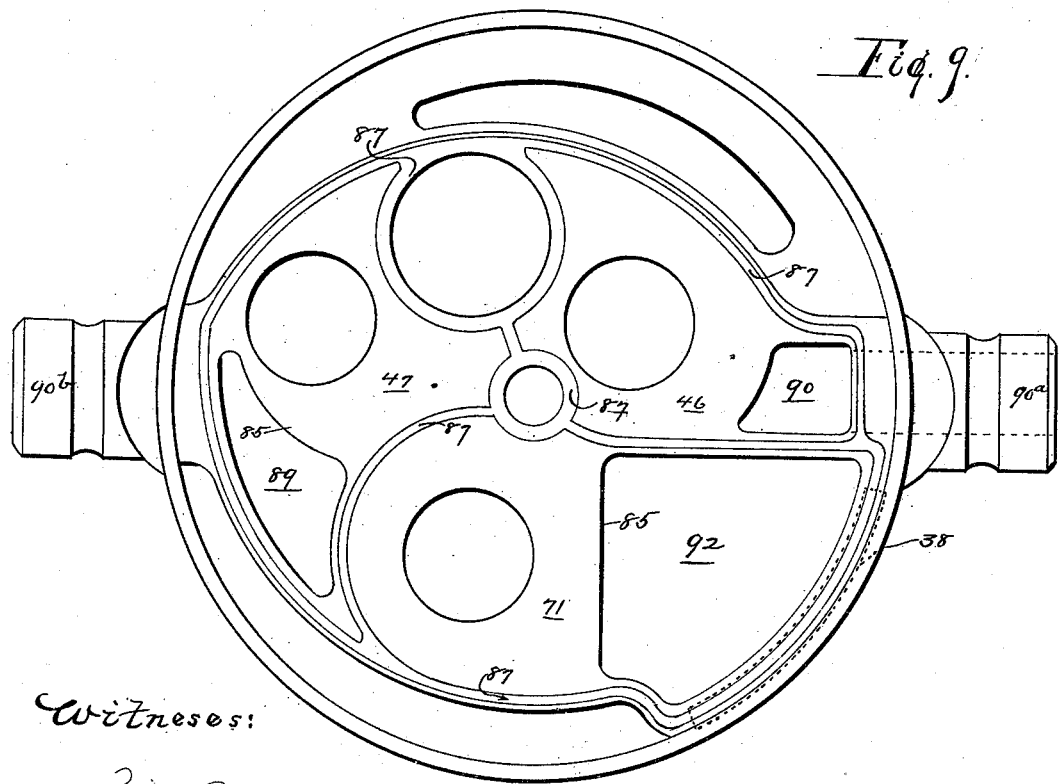
Witneses:
Frank Lambert
Wm A. Harries
Inventor:
John Thomson (No Model.) 8 Sheets—Sheet 6.

J. THOMSON.
DIAPHRAGM WATER METER.

No. 358,508. Patented Mar. 1, 1887.

Witnesses:
Frank Lambert
Wm. A. Harries

Inventor:
John Thomson (No Model.)  8 Sheets—Sheet 7.

J. THOMSON.
DIAPHRAGM WATER METER.

No. 358,508.  Patented Mar. 1, 1887.

(No Model.)    J. THOMSON.    8 Sheets—Sheet 8.
DIAPHRAGM WATER METER.
No. 358,508.    Patented Mar. 1, 1887.
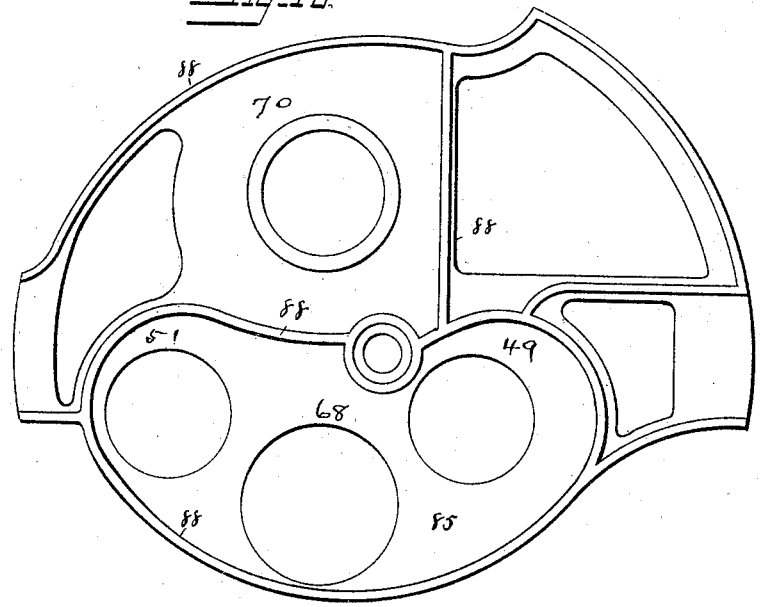
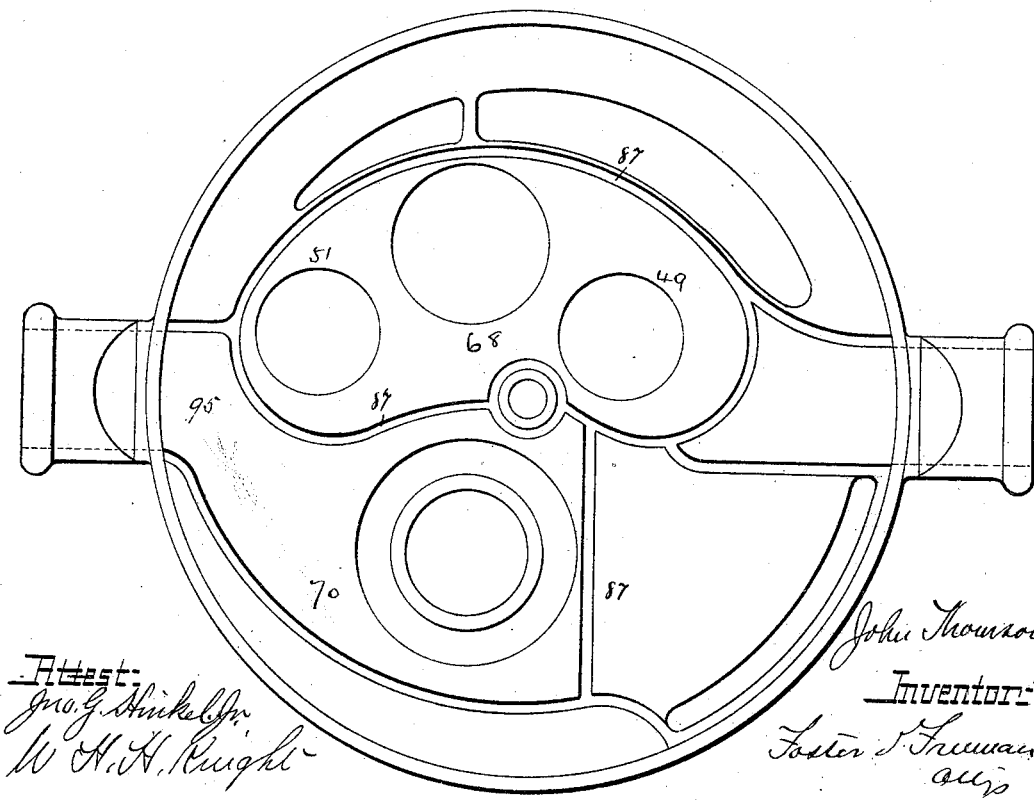

UNITED STATES PATENT OFFICE.

JOHN THOMSON, OF BROOKLYN, ASSIGNOR TO THE WATER-WASTE PREVENTION COMPANY, OF NEW YORK, N. Y.

DIAPHRAGM WATER-METER.

SPECIFICATION forming part of Letters Patent No. 358,508, dated March 1, 1887.

Application filed May 25, 1886. Serial No. 203,238. (No model.)

*To all whom it may concern:*

Be it known that I, JOHN THOMSON, of Brooklyn, Kings county, State of New York, have invented certain new and useful Improvements in Water-Meters, of which the following is a specification.

My invention comprises a fluid-meter of that class in which the displacement is effected positively by means of a reciprocating piston and a valve system.

The objects of this invention will be severally pointed out in the description hereinafter to follow.

Figure 4:
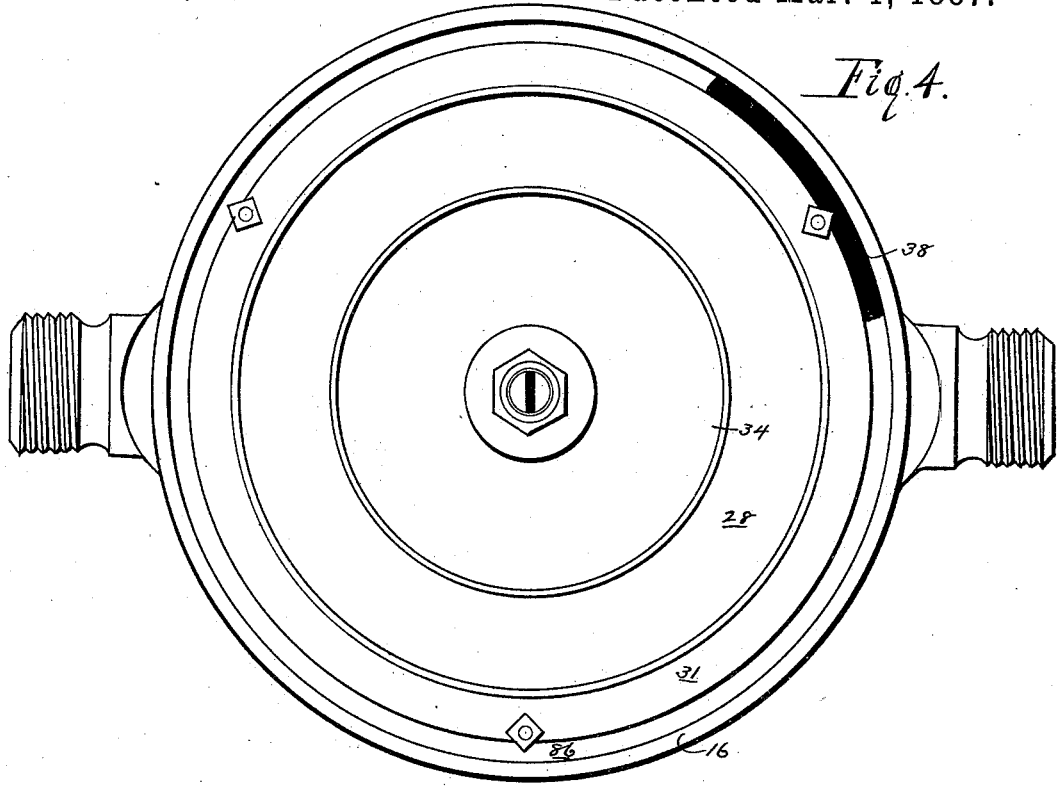
Figure 5:
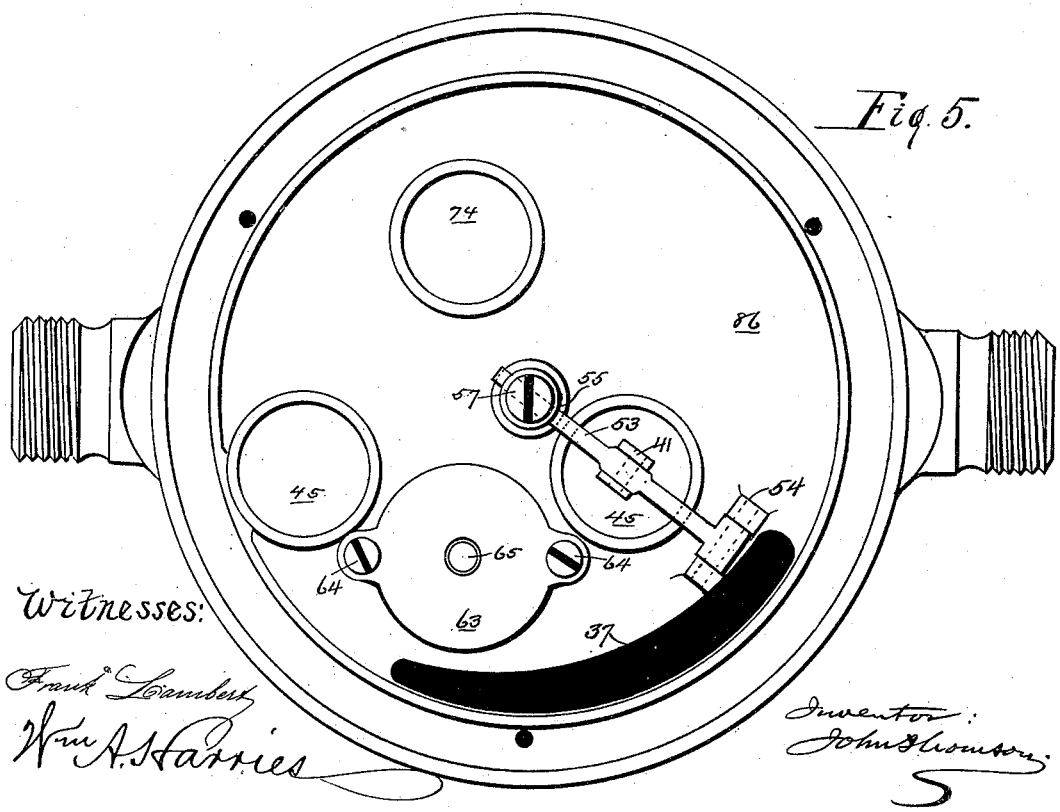
Figure 6:
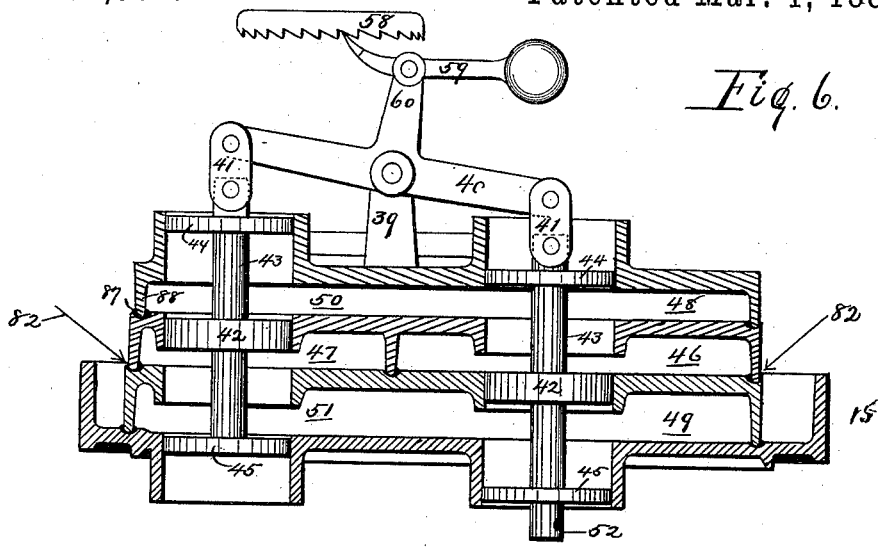
Figure 7:
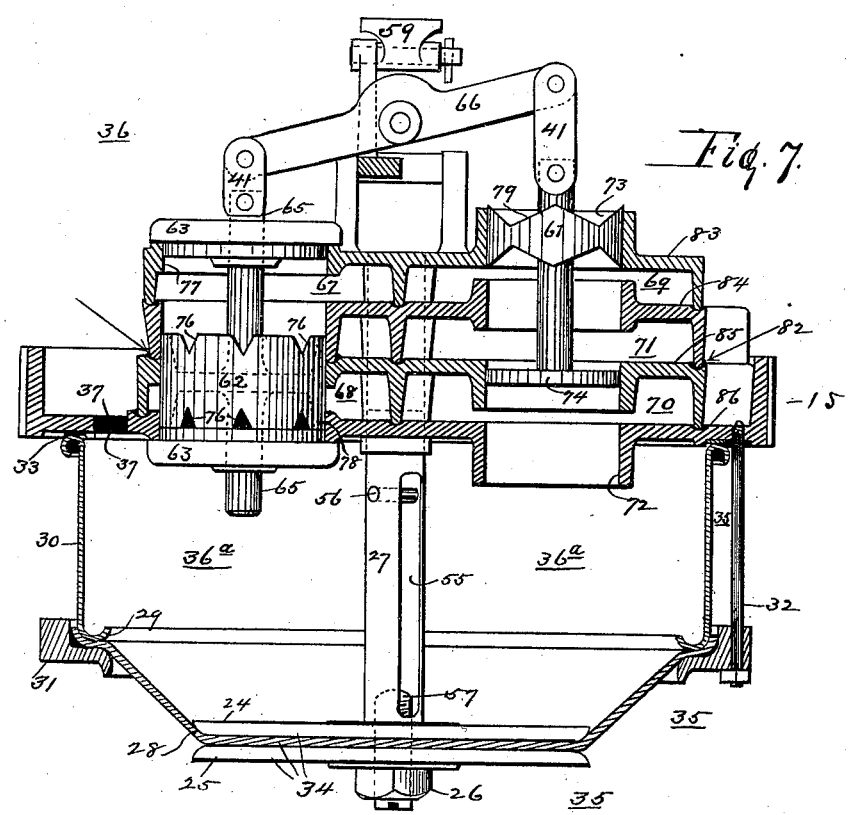
Figure 10:
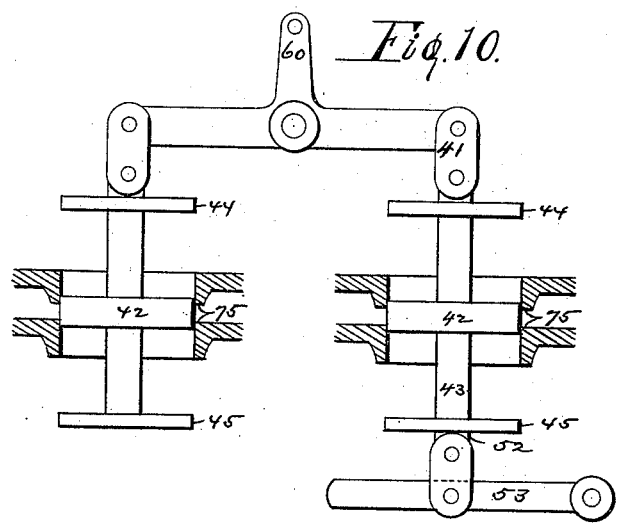
Figure 11:
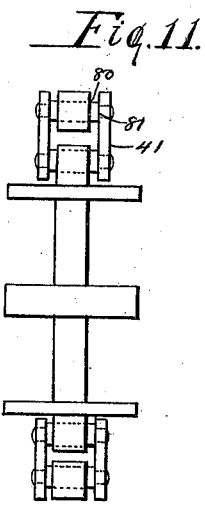
Figure 12:
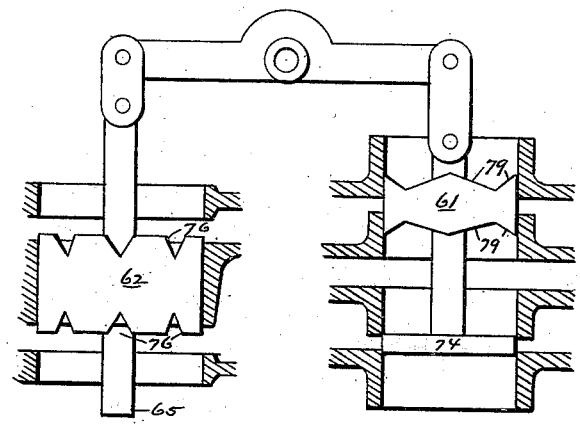
Figure 13:
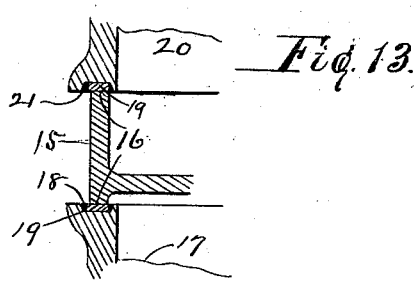
Figure 14:
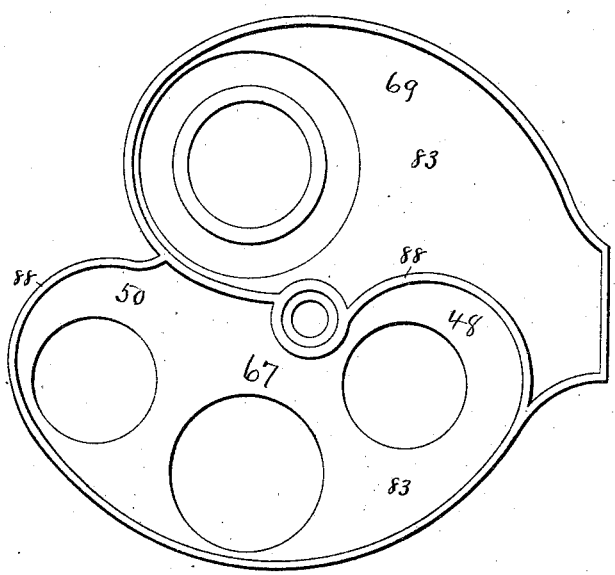
Figure 15:
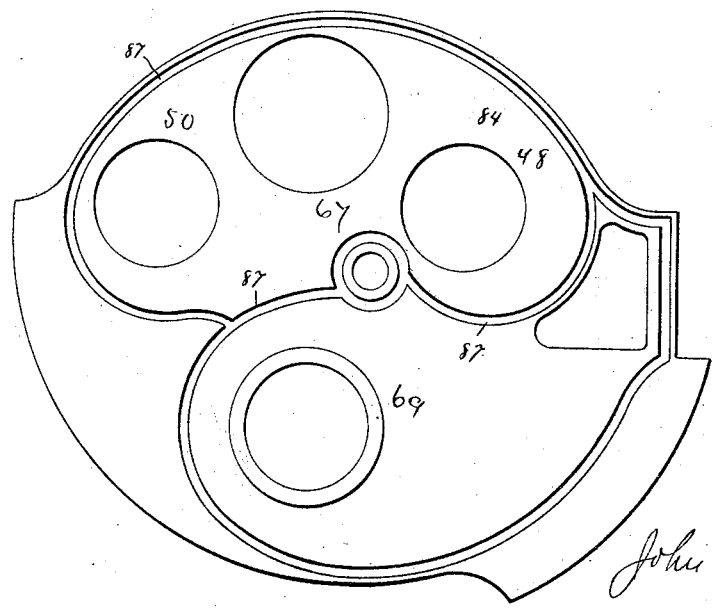

In the drawings, Figure 1 is a front elevation of the meter with sections of the cylinders broken away to show the upper and lower chambers. Fig. 2 is a top plan view of the valve-casing and valve-action. Fig. 3 is a front elevation, and Fig. 4 a bottom plan view, of the same. Fig. 5 is a bottom plan view of valve-casing and valve-action, the piston and internal cylinder being removed to expose the same. Fig. 6 is a vertical transverse section on line $c$ of Fig. 2; and Fig. 7 is a like view on line $e$, both being viewed in the direction of the arrows opposite letters $c$ and $e$. Fig. 8 is a plan view of the bottom of plate 84. Fig. 9 is a plan of the top of plate 85. Figs. 10 and 11 are detail sectional and end views of plunger-valves, and Fig. 12 is a like view of main valve and valve-piston. Fig. 13 is a detached sectional view of cylinders and valve-casing, showing the mode of securing the gaskets. Fig. 14 is a plan of the bottom of the plate 83. Fig. 15 is a similar view of the top of the plate 84. Fig. 16 is the bottom of plate 85, and Fig. 17 is the top of plate 86.

The first particular of the invention refers to the general arrangement of the parts whereby iron cylinders may be employed simply to resist pressure, and which shall be entirely free from water-ways and susceptible of being cast without cores.

To this end the meter consists of one main section, 15, constituting the valve-casing or septum, and to which are attached or connected the pipes, valves, piston, and all necessary appliances for operation. When all the parts are in proper position and adjustment, the casing is placed so that the lower edge of the rim 16 (see Fig. 13) rests upon the flange of the lower cylinder, 17. The flange of the cylinder is recessed, as at 18, to receive a narrow gasket, 19, the width of the recess being slightly in excess of the width of the edge of the rim. The flange of the upper cylinder, 20, is also recessed, as at 21, to receive a duplicate gasket; hence when the cylinders are bolted together the gaskets, in consequence of the limited bearing-surface, are pinched very tightly, but are prevented from escape by the walls of the recess. The advantages thereby derived are, that the gaskets can be made, like ordinary rubber bands, without any loss of material, and that the bolts and cylinders require but little straining to make a perfectly-tight and durable joint.

The second particular relates to the general arrangement of the valve-casing, valves, and connections by which cored sluices or waterways in the cylinders are avoided, the valves brought into perfect balance, and other contingent advantages.

Within the valve-casing itself are formed all the water-ways necessary to the operation of the valves and piston, the threaded pipe-connections 22 23 also forming a part of the valve-casing and opening directly into the inlet or outlet chamber, as the case may be. In this meter either side may be inlet or outlet with proper operation of the entire instrument; but for convenience of the present description it will be assumed that the current flows from right hand to left hand.

The means for effecting the main displacement consists of the plates 24 25, Fig. 7, secured by the nut 26 to the piston-rod 27. Between the plates is interposed a diaphragm, 28, the outer edge of which is secured to the rounded rim 29 of the internal cylinder, 30, by the clamping-ring 31 and bolts or studs 32. A light gasket, 33, is interposed between the upper rim of the internal cylinder and the face of the casing. Therefore, when the bolts 32 are in position, they secure the internal cylinder, the clamping-ring, and the diaphragm in position, and also produce proper joints between the connections; but it is not essential that the internal gasket, 33, be used, as the joint may be made at that point by means of common paint, asphaltum, or hydraulic cements. The said plates 24 25 and section of diaphragm secured between the same will be herein designated as the "main piston" 34.

While I prefer the use of a diaphragm, and the conditions conducive to its successful operation are herein to be described, I am yet not restricted to such use, as a solid piston working within the internal cylinder will operate with satisfaction. This, however, will form the subject-matter of another specification.

The internal cylinder, piston, and diaphragm, arranged as described, form within the lower cylinder two compartments—an outer, 35, and an inner, $36^a$. Through the main plates of the valve-casing two openings are formed, 37 38. The opening 37 connects the compartment above the casing, formed by the upper cylinder, with its sub-compartment $36^a$. The opening 38 connects directly with compartment 35, and also with the proper chamber 71 within the casing. The valves are of the piston type, the bearings for which pass entirely through the valve-casing. The consequence of this is, in view of the connection of the compartments 36 $36^a$ due to the opening 37, that both ends of the valves are in a common chamber exposed to equality of pressure, and hence with respect thereto the valves are in perfect equilibrium.

The general conditions of operation consist in causing the main piston and piston-rod to operate valves which alternately deflect the inlet to one side or the other of a small piston, (to be hereinafter termed the "valve-piston,") to which is connected the main valve, which controls the action of the said main piston and piston-rod.

The construction whereby to effect this operation is as follows: Pivotally mounted upon a standard, 39, Fig. 6, is a vibrating lever, 40, to each extension of which is connected by links 41 a valve, 42, each valve being a duplicate of the other. These valves are mounted upon or are a part of the spindles 43, said spindles having at their extensions two additional valve sections, 44 45. Assuming the chamber 46 to be connected with the inlet-pipe and chamber 47 connected with the outlet-pipe, it will be seen that as the valves are shifted to alternate positions the inlet-current is simply permitted to flow into chamber 48 or 49, and that the outlet-current is permitted to flow alternately from chambers 50 51 to chamber 47. The function, therefore, of the valve-sections 44 45 is simply to complete the closure of the chambers and, as previously set forth, to put the valves in equilibrium with respect to pressure. To an extension, 52, of one of the spindles a lever, 53, is connected by links, the lever being pivotally secured to the face of the casing, as at 54, Fig. 5. The free end of said lever projects through a slot, 55, formed in the piston-rod, the pin 56 engaging the lever on the downstroke, and the adjusting-screw 57 engaging the lever on the upstroke. Upon each motion of the piston, at or nearly at the termination of its stroke, the valves 42—which are herein termed "plunger-valves"—are shifted to their alternate position. This motion is utilized to also operate the register through the medium of the ratchet-wheel 58 and pawl 59, the latter being mounted upon the arm 60, forming a part of the lever 40.

The effect of the aforesaid reversal of the plunger-valves will now be considered in connection with the main valve 61 and valve-piston 62, Fig. 7. In forming the valve-piston bearing it is first bored completely through, in like manner with that of the plunger-valves and main valve, and is then closed by the cylinder-heads 63, fixedly secured to the casing, as by the screws 64, the spindle 65, however, passing through and having a bearing in both of said cylinder-heads. The valve-piston is thus maintained in balance with respect to the pressure exerted upon the ends of the spindle. The main valve is coupled to the valve-piston by a vibrating lever, 66, and connecting-links in same manner as the plunger-valves. The main valve is therefore as of a part of the valve-piston and must partake of its action. The aforesaid chambers 48 and 50 are connected with and are, in fact, a part of chamber 67, while chambers 49 and 51 are also in like circuit with chamber 68. Now, with the plunger-valves in the position assumed in drawings, the inlet-current will be deflected first to chamber 48; but this will have had no dynamic effect upon the plunger-valve, as the force of the current, or that due to its head, will be equally transmitted to and be borne by the spindle, in consequence of the valve-sections being a part of said spindle. The current passes on to chamber 67, (which, owing to the cylinder-heads being as a part of the casing, is a pressure chamber,) when the valve-piston is at once shifted to the position shown, meantime displacing a like volume from below the valve-piston, first to chamber 68, next to chamber 51, and thence to chamber 47 and out. The water passes to or from chamber 46 through opening 90, Fig. 9, which is connected directly with the pipe $90^a$. In like manner the current from chamber 47 is conducted to pipe $90^b$ by opening 89. In the main valve chamber 69 is connected to pipe $90^a$ by opening 90, and chamber 70 with pipe $90^b$ directly by chamber 95, Fig. 17.

With respect to the main valve 61, chamber 69 in the present instance is the inlet, chamber 70 is the outlet, and chamber 71 is constantly the intermediate, which latter connects with the opening 38 and outer and lower compartment, 35, wherefore it follows that the main current will now flow from chamber 69 to 71, thence through the opening 38 to the lower side of main piston and diaphragm, causing them to ascend and displace the volume in compartment $36^a$ through the port 72; chamber 70, and thence out. Upon the completion of the up motion of the main piston the plunger-valves will be reversed, when the inlet 46 will be connected to chamber 49, and thence to chamber 68 and the outlet 47 to chamber 50, and thence to chamber 67. The main valve will next be reversed by the motion of the valve-piston, the inlet flowing from chamber 69 up through port 73, down through opening 37 to compartment 36ª, and as port 72 will have been closed by the lower section, 74, of main valve the displacement of main piston is from compartment 35 back through opening 38 to intermediate chamber, 71, and thence to outlet-chamber 70.

The third particular deals with the ports, water-chambers, general mode of suspending and fitting the valves, and the construction of the valve-piston and main valve, whereby to cushion the same, and to avoid water-shock and pulsation due to the reciprocating action of the several parts and reversal of the current within the meter.

After the valve-piston will have been operated no current passes the plunger-valves until they are again reversed. This is an obvious and important advantage in that the plunger-valves are thus moved during the greater portion of their action through "dead-water."

When the plunger-valves are exactly at the center of motion, the arrangement is such that both valves lap the ports 75, Fig. 10, so that there is an absolute closure before the conditions of the chambers are reversed. The main valve also laps its ports when the valve-piston is at the center of its stroke, and during the time of this lap the main piston is completely stopped. It therefore follows that the entire volume or capacity of the meter must pass at this instant by way of the valve-piston and its ports, and if the valve-piston and main valve are of desirable dimensions, this means a very high velocity of action in these parts, which heretofore has resulted in a disagreeable thump, due to a too abrupt stoppage of the acting parts, or in pulsation in the mains, or in water-shock, or all combined. Of course the instant that the main valve begins to open, the main piston also begins to act, which somewhat relieves the valve-piston; but at fast flows the excess of pressure between the inlet and outlet chambers is always sufficient to drive the valve-piston with great rapidity and force, and this is more particularly noticeable and difficult to overcome when the valves are entirely free at all rates and conditions of flow. In usual practice the pressure upon the valves is in direct ratio to the flow, hence simulating a brake, but at the cost of accuracy and durability. In the present instance the mechanical impact is cushioned by causing the valve-piston to close the outlet as it reaches the termination of its stroke. This is effected by forming a series of sharp V-shaped notches, 76, around both edges of the valve-piston. The cylinder-heads and their bearings in the valve-casing are then constructed to form shallow cushion-cylinders 77 78. The depth of the notches in the valve-piston is greater than the depth of the cylinders, from which it will appear that the motion of the valve-piston is brought cumulatively to a state of rest.

The object of forming the notches deeper than the cushion-cylinder is that the valve-piston may be properly open to the inlet-pressure upon the reversal of the plunger-valves; but another important advantage is also thereby attained—namely, that the valve-piston at fast flows can only start at a velocity equal to the area of the narrow sections of the notches, and hence insures that the main piston properly completes its stroke and opens the plunger-valves to full capacity at all rates of flow.

Pulsation in the mains is obviated by so proportioning the relative areas of ports and valve-openings that the least area thereof during the aforedescribed lap of the main valve shall be equal to that of the inlet-pipe. Water-shock, or "hammer," when the interference with and relief of the flow are practically simultaneous, does not usually produce pulsating or remitting flow, nor is it usually destructive or dangerous. In such cases it is simply disagreeable and annoying. Such effects are due in meters and analogous instances, when produced as specified, to the too speedy reversal of the volume within the meter. In this invention the main or current-reversing valve 61 is formed in the manner shown in Figs. 7 and 12—that is, in having very obtuse V grooves 79, or undulations around the edges—the effect being to cumulatively stop and to cumulatively start the volume of fluid acted upon by the current which passes the port. The current is thus reversed within the meter without shock or vibration.

In fitting the valves and valve-piston they are formed from .001" to .003" less in diameter than that of the bearings. The valves are connected to their respective levers and links (see Fig. 11) by bearing-pins 80, having shoulders 81, each link being riveted against the shoulder. The space between the links is longer than the bearing in the valve-spindles, which latter are free to slide back and forth. The valves are thus suspended perfectly free within their bearings, permitting the annular space between the valves and their bearings to fill with fluid, the film assuming a uniform thickness, and the parts are maintained free from metallic contact. The advantage of coupling the plunger-valves and valve-piston and main valve is that they are thus in equilibrium for either or both movements.

As matter of fact, the only duty required of the main piston is to overcome the inertia of the plunger-valves plus the resistance of the register mechanism. This is of controlling importance and value in the employment of a diaphragm, as it thus requires no metallic backing, but is practically a float in the fluid destructible only by chemical agencies.

The advantages contingent upon the method of cushioning the valve-piston and reversing the current by the main valve are, that these parts may be reduced to the minimum size just sufficient to pass the proper volume, which are thereby subjected to swift currents at the ports, preventing accumulation of sediment upon or around the valves. In like manner the port 72 and opening 37 direct swift currents into or out of compartment 36ª, preventing accumulation of foreign matter upon the main piston and diaphragm.

The fourth and final particular relates to the manner of constructing the chambers within the valve-casing. This will be best understood by referring to Figs. 6, 7, 8, and 9, the latter two being inside plan views of the valve-casing separated horizontally at arrows 82.

The three series of chambers within the casing are formed by four distinct plates, 83, 84, 85, and 86. Wherever it is desirable to have a chamber the upper surface of the plate is grooved or channeled, as 87, and the lower surface of the plate to be superimposed has a flange, as 88, of the desired depth of the chamber and corresponding in outline to the channel. All of the channels on any one plate are connected to form a continuous system, and the flanges are also connected in like manner. The plates are then simply placed together in proper order, heated up as one part and soldered together, the channels forming a reservoir for the melted metal, thus insuring a perfect joint and closure of each and all of the chambers. Were it attempted to solder the parts without this arrangement of flanges and channels, the faces of the flanges and the plates would have to be finished flat, and even then there would be no certainty as to the perfection of the chamber, as the melted solder would be free to flow and spread over the surface of the plate. The advantages of this mode of building up the valve-chamber are, the castings may be formed without cores, very light, of uniform quality, and at low cost.

After the plates are joined to form the valve-casing the only remaining operation of consequence is to bore the bearings for the valves, valve-piston, and piston-rod, and herein lies another contingent advantage due to passing the bearings entirely through the casing—viz., the facility with which a bearing of this character may be formed. It will be observed that the bearings do not require to be in alignment each with the other, nor at an exact distance apart, the links and side-thrust of the spindle-bearings, previously herein described, allowing for any moderate inaccuracy in the particulars named. It is simply required that the bearings be cylindrical.

The manner of connecting the chambers of different series in circuit is shown in Figs. 8 and 9, in which the opening 89 through the plate 85 connects chamber 47 with the outlet-chamber 70. In like manner opening 90 connects chamber 46 with the inlet-opening 91 through plate 84, further connecting the inlet to chamber 69, while opening 92 through plate 85 connects the intermediate chamber, 71, with opening 38.

The meter thus constructed, as a whole, is light, compact, convenient to handle, is susceptible of being manufactured at a low cost, may be readily adapted to any and all classes of duty, and, in consequence of its very low coefficient of friction, offers the minimum obstruction to flow, while being both accurate in measurement and durable and reliable in service.

While I have thus specifically described my invention, it is evident that it is not limited to the precise construction of devices shown in the accompanying drawings, as many and various modifications will readily suggest themselves to those skilled in the art, but are embraced in the broad principles of my invention.

I claim—

1. The valve-casing having a complete system of piston-valves, the ports forming the bearings for the valve and passing entirely through the casing, and an opening through the casing, whereby both ends of said valves are exposed to a like or neutral pressure, for the purpose described.

2. The combination, with the valve-casing and main piston, of the duplicate plunger-valves having end sections, as 44 45, and coupled to a vibrating lever, one of said valves controlling the inlet and the other of said valves controlling the outlet currents to and from the valve-piston only, for the purpose described.

3. The combination, with the valve-casing, of the duplicate plunger-valves having the end sections, 44 45, and coupled to a vibrating lever, the said end sections acting to neutralize the effect of pressure upon the valves, and also to complete the chambers within the valve-casing, substantially as described.

4. In combination with the valve-chamber and the ratchet-wheel, as 58, connecting with the registering mechanism, the plunger-valves, the lever coupling the same and having an extension upon which is mounted a pawl, as 59, arranged to engage the ratchet-wheel, and means for operating said combination, as the lever 53, piston-rod 27, and piston 34, for the purpose described.

5. The valve-piston and main valve coupled to act as one part, in combination with the valve-casing, the main valve having a bearing entirely through the casing, and the valve-piston acting to form positive and negative pressure-chambers within the casing, substantially as described.

6. The valve-piston and main valve coupled to act as one, and the duplicate plunger-valves, in combination with the valve-casing, arranged substantially as described, one of said plunger-valves acting to alternately deflect the inlet-current to one side or the other of the valve-piston, and the other of said plunger-valves acting to permit the valve-piston to displace into the outlet-chamber, substantially as set forth.

7. The valve-piston having openings on its edges, as 76, in combination with the cushion-cylinders 77 78, whereby the velocity of the action is gradually absorbed without shock or vibration, substantially as described.

8. The valve-piston having openings on its edges, as 76, in combination with the cushion-cylinders 77 78, said openings being deeper than the said cylinders, whereby the face of the valve-piston is properly exposed to the inlet-pressure, substantially as described.

9. The valve-piston having openings on its edges, as 76, in combination with the cushion-cylinders 77 78, said openings being deeper than the said cylinders, whereby the valve-piston acquires its maximum velocity cumulatively in a ratio equal to the area exposed by said openings, substantially as described.

10. The combination, with the water-chamber, as 36, of the valve-casing included in said chamber, the cylinder-heads 63, forming a closed pressure-chamber within the casing, and having inlet and outlet passages connecting said pressure-chamber with the inlet and outlet pipes, the valve-piston working in said pressure-chamber, and having its spindle 65 bearing in the cylinder-heads, substantially as described.

11. The plunger-valves, main valve, and valve-piston coupled to act in pairs separately, in combination with the casing, the arrangement and construction being such that the plunger-valves are in dead-water except during the operation of the valve-piston, substantially as described.

12. The plunger-valves, main valve, and valve-piston coupled to act in pairs separately, in combination with the casing, the arrangement of the valves in relation to the ports being such that the plunger-valves are first caused to act and completely close all chambers before deflecting the currents to and from the valve-piston, substantially as described.

13. The plunger-valves, main valve, and valve-piston coupled to act in pairs separately, in combination with the casing, the arrangement and construction being such that with the valve-piston in the center of its motion the main valve will have completely lapped its port, at which time also the minimum area of any one of the chambers or ports in the circuit is equal to the area of the inlet-pipe, substantially as described.

14. The plunger-valves, main valve, and valve-piston coupled to act in pairs and to counterbalance each other, said valves and valve-piston being maintained in a vertical position in the valve-casing, substantially as described.

15. The valve-casing having three series of horizontal chambers with vertical valve-bearings formed in the walls of the casing and passing through the casing at a right angle to the chambers, substantially as described.

16. The valve-casing having three series of horizontal chambers, said chambers being formed by four distinct plates having flanges of the required contour and depth of the chambers, the said plates and flanges being thereafter joined to form the unitary casing, substantially as described.

17. The valve-casing having three series of horizontal chambers, said chambers being formed by four distinct plates having flanges and channels of the required contour and depth of the chambers, the said flanges being adapted to register in the said channels, whereby the plates may be joined to form the casing proper by soldering the flanges within the channels, for the purpose described.

18. The valve-casing having three series of horizontal chambers with vertical valve-bearings formed in the walls of the casing and passing through the casing at a right angle thereto, and having openings formed in the internal plates to connect the chambers of different series in common circuit, substantially as described.

In testimony whereof I have signed my name to this specification in the presence of two subscribing witnesses.

JOHN THOMSON.

Witnesses:
WILLIAM THOMSON,
FRANK LAMBERT.